United States Patent
Semanderes et al.

(10) Patent No.: US 6,471,751 B1
(45) Date of Patent: Oct. 29, 2002

(54) POLYCYCLONIC VACUUM COLLECTORS FOR VIRTUALLY NON-STOP ENVIRONMENTAL REMEDIATION

(75) Inventors: Stavros Semanderes, Washington, PA (US); John M. Lunardini, Pittsburgh, PA (US)

(73) Assignee: Houston Industrial Corporation, Houston, PA (US)

( * ) Notice: Subject to any disclaimer, the term of this patent is extended or adjusted under 35 U.S.C. 154(b) by 0 days.

(21) Appl. No.: 09/658,915

(22) Filed: Sep. 11, 2000

(51) Int. Cl.[7] .................. B01D 50/00; B01D 45/12; B01D 29/56; B01D 29/70
(52) U.S. Cl. ................. 95/271; 55/323; 55/337; 55/300; 55/334; 55/315; 55/341.1; 55/419; 55/486; 55/459.1
(58) Field of Search .................. 55/337, 321, 323, 55/486, 300, 334, 315, 345, 341.1, 419, 459.1, 459.2; 15/353; 406/171, 173; 95/268, 271

(56) References Cited

U.S. PATENT DOCUMENTS

| | | |
|---|---|---|
| 4,133,658 A | 1/1979 | Callewyn |
| 4,735,639 A | 4/1988 | Johnston |
| 4,790,865 A | 12/1988 | DeMarco |
| 4,820,315 A | 4/1989 | DeMarco |
| 5,080,697 A | 1/1992 | Finke |
| 5,120,165 A * | 6/1992 | Walko, Jr. ............ 406/40 |
| 6,090,184 A * | 7/2000 | Cartellone ............ 95/69 |

* cited by examiner

Primary Examiner—Robert A. Hopkins
(74) Attorney, Agent, or Firm—Konstantinos Petrakis

(57) ABSTRACT

A vacuum collector is provided comprising a suction hose, a first drum with a cover having a cylindrical head capable of generating powerful, small-diameter cyclones, a second drum capable of generating large-diameter cyclones, and a stack of three modules containing vacuum-producing motors atop a HEPA filter atop primary filters. The suction hose is connected to the inlet of the small-diameter cyclone-generating head on the cover of the first drum. The stack of modules containing motors, HEPA filter, and primary filters is mounted on the second drum. The two cyclonic drums communicate through a flexible vacuum hose. When the vacuum-producing motors pull air from the interior of the vacuum collector, the suction hose sucks atmospheric air mixed with contaminants from a surface into the head, which spins the contaminant-laden air-stream into a powerful, small-diameter cyclone. As a result of cyclonic action, the contaminant laden air-stream spirals to the bottom of the first drum, deposits most of its contaminants, reverses course, exits the drum, and enters the second drum, where it spins into a large-diameter cyclone, deposits more contaminants, passes through the primary and HEPA filters, and exhausts via the vacuum-producing motors. Collectors comprising more than two communicating cyclonic drums for tailored environmental remediation are also described.

20 Claims, 12 Drawing Sheets

POLYCYCLONIC VACUUM COLLECTORS FOR VIRTUALLY NON-STOP ENVIRONMENTAL REMEDIATION

1. CROSS-REFERENCE TO RELATED APPLICATIONS

Not applicable

2. FIELD OF THE INVENTION

This invention relates to vacuum collectors, specifically to cyclonic vacuum collectors employing HEPA (High Efficiency Particulate Air) filters to achieve large-scale environmental remediation.

3. BACKGROUND

3.1. Environmental Remediation: A Critical Problem Accompanying Sandblasting Sandblasting is an important preliminary to the painting of large metallic structures, e.g., bridges. Sandblasting removes old paint and cleans the bridge to be painted. Sandblasting produces large quantities of reactive, toxic dust. Significant amounts of neurotoxic lead, carcinogenic chromium, and other highly toxic materials make this dust very dangerous. Collecting paint dust from sandblasted bridges in a safe manner is necessary and presently extremely difficult. Federal regulations require that vacuum collectors picking up paint dust have HEPA filters to ensure their exhaust is better than 99.97% free of dust particles greater than 0.3 micron in diameter. At present, there are no small portable vacuum collectors that can pick up large amounts of sandblasted materials according to these federal regulations. Therefore, there is a great need for a portable vacuum collector, which protects the sandblaster and enables environmental remediation in accordance with the law.

3.2. Environmental Remediation: A Critical Global Problem

Bridge-sandblasting does not alone pollute the environment. Many economic activities, such as manufacturing, building, infrastructure maintenance, etc., create toxic byproducts which are dispersed in the land, sea, and air. These toxic byproducts harm or destroy life and, with economic activities across the globe at historical maxima, the remediation, i.e., the cleaning and restoration, of the harmed environment is now a critical planetary need.

Solids, such as heavy metals (e.g., lead, mercury, chromium, zinc, etc.), chemical compounds of heavy metals, asbestos, other toxic substances, etc., occasionally mixed with liquids, are a major part of environmental pollution. The best way to deal with such materials is to pick them up using the precise action of a vacuum collector or cleaner, transfer them to a container, and seal and bury this container, in a suitable place.

The vacuum collector this cleaning operation requires is small but powerful, armed with a HEPA filter, which insures exhaust air of high purity, and able to handle large-scale cleaning, including dust removal, nonstop. The desired vacuum collector is also simple as well as inexpensive, to buy and operate, since a significant amount of solid pollutants is created by small contractors, manufacturers, builders, and others, who lack the resources to conduct complicated, costly remediations. As the following discussion of the prior art shows, this vacuum collector is presently unavailable, and this lack both prevents enforcement of federal environmental standards and destroys the environment.

3.3. Prior Art (a) U.S. Pat. No. 4,753,639 to Johnstone describes a vacuum loader employing an air blower, a filtering module, and a debris collector. The blower sucks debris-laden air into the debris collector, some of the debris is gravitationally deposited in the collector, the partially cleaned air then goes through the filters and ultimately into the atmosphere. Lack of powerful cyclonic cleaning, among other things, makes this vacuum loader unsuitable for challenging operations.

(b) U.S. Pat. No. 4,133,658 to Callewyn describes a dust collector employing a single cyclone-producing module, which is mounted on a dust collector, and a blower. The blower sucks dust-laden air into the cyclone module, the air spins depositing dust into the dust collector below, and then goes through a vortex device inside the cyclone chamber, out of the cyclone chamber, into an external filter bag, and finally into the atmosphere. Although more potent than analogous non-cyclonic appliances, this appliance cannot efficiently clean heavily contaminated areas, because, among other deficiencies, it has only one cyclone.

(c) U.S. Pat. No. 5,080,697 to Finke describes a pull-down vacuum cleaner of one module containing a conical cyclone generator as well as primary and secondary filters, with the primary filter covering the bottom of the module. A vacuum pump sucks contaminant-laden air into the module, the air-stream strikes the cone, spins into a cyclone, deposits contaminants on the primary filter below, and goes through the primary filter, eventually through the secondary filter, and finally into the atmosphere. Although this vacuum cleaner minimizes size by artfully combining cyclonic cleaning, contaminant storage, and primary as well as secondary filtration within a single module, its peculiar use of the primary filter surface as contaminant storage site renders it unsuitable for rapid, efficient cleaning of heavily contaminated areas.

(d) U.S. Pat. No. 4,790,865 to DeMarco describes dust collectors employing, among other components, a single cyclone module mounted on a dust collector and another distant but communicating module containing filters; a device accelerating dirty air before it goes through the filters is an optional part of the filter module. Dust-laden air is sucked into the cyclone module, the air spins, deposits dust in the dust collector below, then travels through a hose to the filter module, through the components of the filter module, and finally into the atmosphere. With only one cyclone, this dust collector lacks the power for challenging cleaning operations.

(e) U.S. Pat. No. 4,820,315 to DeMarco describes a complicated vacuum loader of many moving parts, employing, among other things, (1) a prior art cyclone-producing module mounted on a bagger, which collects and packages contaminants in bags, (2) a second prior art cyclone-producing module, communicating with the first, mounted on another contaminant storage module, (3) a complex device, comprising dual valves, tubes and hoses, for transferring contaminants gathered in the contaminant storage module back to the bagger, (4) a third module containing primary filters mounted on the second cyclone module, and (5) a fourth module containing secondary (HEPA) filters, distant from the module containing the primary filters but communicating with it through a pipe or hose. (The patent also describes another similar vacuum loader, which lacks the fourth module housing the secondary filters, and which places either primary or secondary filters in the third module.) In operation contaminant-laden air is sucked into the first cyclone chamber, the air spins, deposits contaminants into the bagger below, enters the second cyclone chamber, spins, deposits additional contaminants into the collection module below, then goes through the primary filters above, through the pipe or hose, through the module containing secondary filters, and eventually into the atmosphere. Contaminants gathered in the collection chamber below the second cyclone are transferred back to the bagger, through operation of the complex device mentioned above, and eventually bagged.

Although this DeMarco loader features two communicating cyclone chambers, it comes with many components and great complexity, which combine to decrease usefulness in several ways.

First, cleaning the secondary (HEPA) filters of the loader, an important maintenance task, can be messy and dangerous, because the secondary filters are separate from the primary filters, in a distant module lacking a contaminant storage chamber. For to clean these secondary filters, the filters must first be taken out of the module housing them. And when they are taken out and cleaned, contaminants adhering on the filters fill the air and proceed to land nearby, which is primarily the face of the person cleaning the filters. Contaminants, especially toxic contaminants, on the face or in the lungs of the operator of the loader, every time the secondary filters need cleaning, is an important limitation of the DeMarco loader.

Second, the loader is less durable and more expensive to maintain than it could have been, because it has many moving parts which do not participate in air cleaning and contaminant storing, such as valves, pistons, a complicated device operating the bagger, etc.

Third, the loader features low design and construction economy with respect to air cleaning and contaminant storing, because most components of the loader neither clean air nor store contaminants—instead, they perform functions such as transferring contaminants from a storage site to a bagger, operating the bagger, etc. This low design and construction economy brings disadvantages, including relatively (1) low efficiency, (2) low capacity, (3) high structural and operational complexity, (4) high purchase price, and (5) expensive maintenance. Indeed these disadvantages can be seen in action in the requirement for an unusually powerful vacuum-producing motor—a 80 hp motor—for production of a relatively low vacuum—217 inches on the water scale—inside this loader. Design and construction limitations seriously limit the cleaning power of this loader.

Due to limitations relating to cleaning power, maintenance, durability, capacity, efficiency, cost, and operability, the DeMarco loader is no solution to the challenge of large-scale environmental remediation. This challenge requires a vacuum system that is powerful, simple, easy to maintain and operate, durable, of high capacity and efficiency, and of low cost.

4. SUMMARY OF THE INVENTION

Using extensive prototype building and testing, findings made over three decades of work in the fields of industrial infrastructure maintenance and environmental remediation, and certain theoretical principles discussed in Section 6.6, a novel, much-needed vacuum collector for surface decontamination or cleaning was developed. This vacuum collector provides novel, small- and large-diameter cyclone generators, and harnesses the cleaning power of multiple, cooperating cyclones to achieve safe, relatively inexpensive, virtually nonstop decontamination. With these capabilities, the invented multiple-cyclone, i.e., polycyclonic, collector advances the goals of environmental remediation across the globe.

The invented vacuum collector comprises a series of at least two fluidically communicating cyclonic drums, each capable of cleaning contaminant-laden air by both spinning it into a cyclone of unique shape and collecting the contaminants deposited by the cyclone's centrifugal forces. The first drum in this series has a side wall, a bottom wall, and a moveable cover. To the cover of the first drum is mounted a structure defining a cylindrical chamber which communicates with the drum; this is the cyclone-producing head, or "the head" of the first drum. The head has an inlet port, which is connected to a suction or vacuum hose, and a suitably bent outlet port, which is connected to an inlet port on the next drum of the series of fluidically communicating drums through a segment of vacuum hose. The last drum of the series of fluidically communicating drums is smaller than the first. To this drum is mounted a stack of three communicating cylindrical modules: a covered motor housing containing vacuum-producing motors atop a HEPA filter housing containing a HEPA filter atop a primary filter housing containing primary filters made of singed polyester felt. The last drum employs a novel, large-diameter cyclone generator, which comprises a cylindrical region between the drum side-wall and the primary-filter housing side-wall as cyclonic chamber and an aerodynamically shaped pipe segment feeding contaminant laden air along a tangent to this cyclonic chamber.

In operation the vacuum-producing motors evacuate the interior of the collector, the resulting vacuum sucks air mixed with contaminants off a contaminated surface through the suction hose, and the contaminant-laden air streams into the cyclone-producing head of the first drum of the series wherein a small-diameter cyclone packing huge centrifugal forces forms. This cyclone bursts into the chamber below defined by the first drum and deposits most of the contaminants therein cleaning the air stream. The cleaned air stream exits through the bent outlet port on the head and ultimately reaches the last drum of the series, where, after cleaning by large-diameter cyclonic action, it sequentially passes through the primary and HEPA filters, which are proximately positioned above the mouth of the last drum, and exhausts through the motors, almost contaminant-free.

It is easily seen that the purity of air going through the filters above the last drum increases with the number of cyclonic drums in the collector, especially where the collector employs cyclonic chambers of different cleaning selectivities. Thus, the invented collector enables control of purity of air going through filters, which air purity determines filter lifetime. And since filter clogging is a primary cause for interrupting vacuum cleaning, and costly filter replacement a main contributor to cleaning cost, the invented collector enables environmental remediation that is both virtually nonstop and relatively inexpensive.

Further objects and advantages of the invented vacuum collector include:

1. Multiple, invented cyclone generators, which produce cyclones of variable contaminant-cleaning selectivities working cooperatively to clean the same contaminant-laden air stream.

2. Novel, aerodynamically-optimized, small-diameter cyclonic heads mounted on large drums, producing and propagating extremely compressed, powerful cyclones. Thus, the high contaminant-processing capability of the small-diameter cyclone is uniquely combined with the high contaminant storing capacity of the large drum to produce a cyclonic drum isolating large amounts of densely packed contaminants per unit time.

3. A novel, aerodynamically-optimized, large-diameter cyclone generator, comprising a specially configured inlet port, which tangentially feeds a contaminant-laden air stream into a narrow cylindrical-shell-shaped chamber formed by the side wall of a primary filter housing positioned inside a drum and the side wall of this drum.

4. Primary filter bags made of singed polyester felt capable of filtering off better than 99% of contaminant particles over 1 micron in diameter for extended periods of time; they can be cleaned remotely without exposing the operator to the contaminants they trap.

5. Most proximate disposition of contaminant collection chamber, cyclone chamber, primary filters, and HEPA filters, which disposition maximizes collector efficiency and capacity while minimizing collector size.

6. Virtually nonstop, inexpensive environmental remediation. Increasing the number, and changing the type, of cyclone generators in the polycyclonic collector dramatically increases the purity of the air going through the filters of the collector, stretching their lifetime. Since filter change and maintenance is disruptive and expensive, the invented polycyclonic collector enables virtually nonstop and inexpensive environmental remediation.

7. Safety. The operator of the vacuum collector, and the area around the operator, are not exposed to the harmful contaminants being removed, because the air the collector discharges is essentially contaminant-free, and because collector filters can be cleaned without exposing the operator to the contaminants.

8. Simple, modular design and construction resulting in great operational flexibility as well as mobility enabling the cleaning of hard-to-reach sites (e.g., hilly, rocky, or precipitous sites, etc.).

9. High durability, because the polycyclonic collector has no continuously moving components, other than the parts of the vacuum-producing motors.

10. Maximum Design and Construction Economy with respect to cleaning and storing contaminants, since all collector components clean air and store contaminants, resulting in (1) high efficiency, (2) high capacity, (3) low machine complexity, (4) low purchase price, and (5) low maintenance cost.

11. Widespread applicability. With unprecedented performance and versatility, the invented polycyclonic collector enables remediation in the fields of industry, construction, maintenance, mining, energy, and elsewhere. Materials that the polycyclonic collector can easily remove include dusts, e.g., toxic dusts, sands, asbestos, heavy metals, and toxic chemical compounds, among others.

Thus, a novel polycyclonic collector has been invented, which saves the environment, protects health, and insures enforcement of the federal environmental laws.

5. BRIEF DESCRIPTION OF THE DRAWINGS

The accompanying drawings, which are incorporated and constitute a part of this specification, illustrate a preferred embodiment, an additional embodiment, and an alternative embodiment of the invention and, together with the general description given above, and the detailed description of the embodiments given below, serve to explain the principles of the invention.

6. DETAILED DESCRIPTION OF THE INVENTION 6.1. Preferred Embodiment

Figure 1:
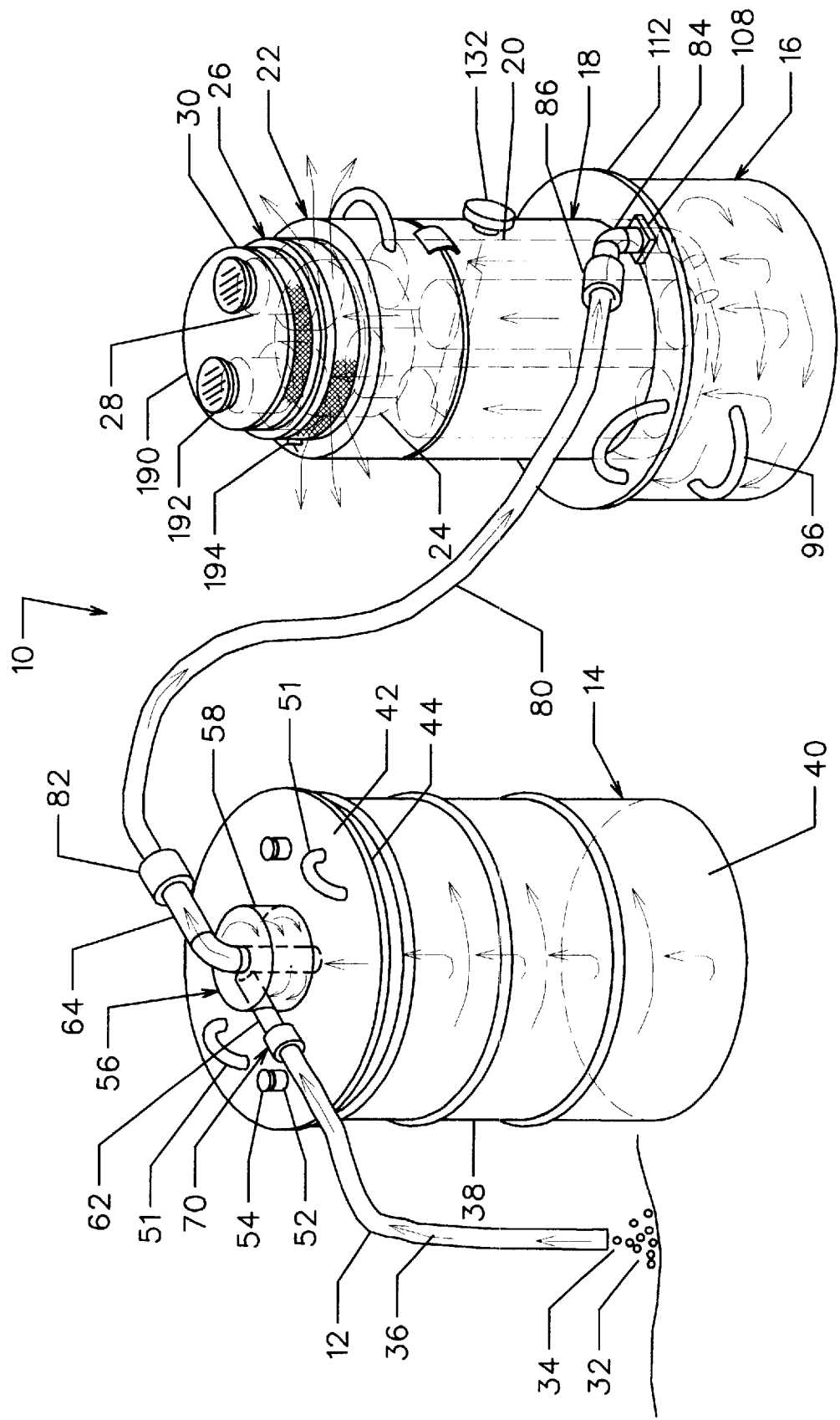
FIG. 1 is a front perspective view of a preferred embodiment of the polycyclonic vacuum collector of the present invention.

Preferred embodiment 10 of the invented polycyclonic vacuum collector, shown in FIG. 1, is bicyclonic, comprising a vacuum hose 12, a first drum 14, a second drum 16, a primary filter housing 18 containing primary filters 20, a HEPA filter housing 22 containing a HEPA filter 24, a motor housing 26 containing two motors 28, and a motor cover 30. Vacuum hose 12 communicates with first cyclonic drum 14, which communicates with second cyclonic drum 16, which communicates primary filter housing 18, which communicates with HEPA filter housing 22, which communicates with motors 28. The purpose of motors 28 is to pull a vacuum. When the motors pull a vacuum, a negative pressure develops inside collector 10, i.e., the pressure inside the collector is lower than the pressure outside, which pressure difference enables vacuum hose 12 to suck air from the atmosphere mixed with contaminants 32 on a surface under open end 34 of vacuum hose 12. This suction produces a flow of contaminant-laden air 36, which enters the first cyclonic drum, spins into a powerful, small-diameter cyclone, enters the second cyclonic drum, spins into a large-diameter cyclone, goes through primary filters 20 and through HEPA filters 24, and exhausts into the atmosphere.

Figure 2:
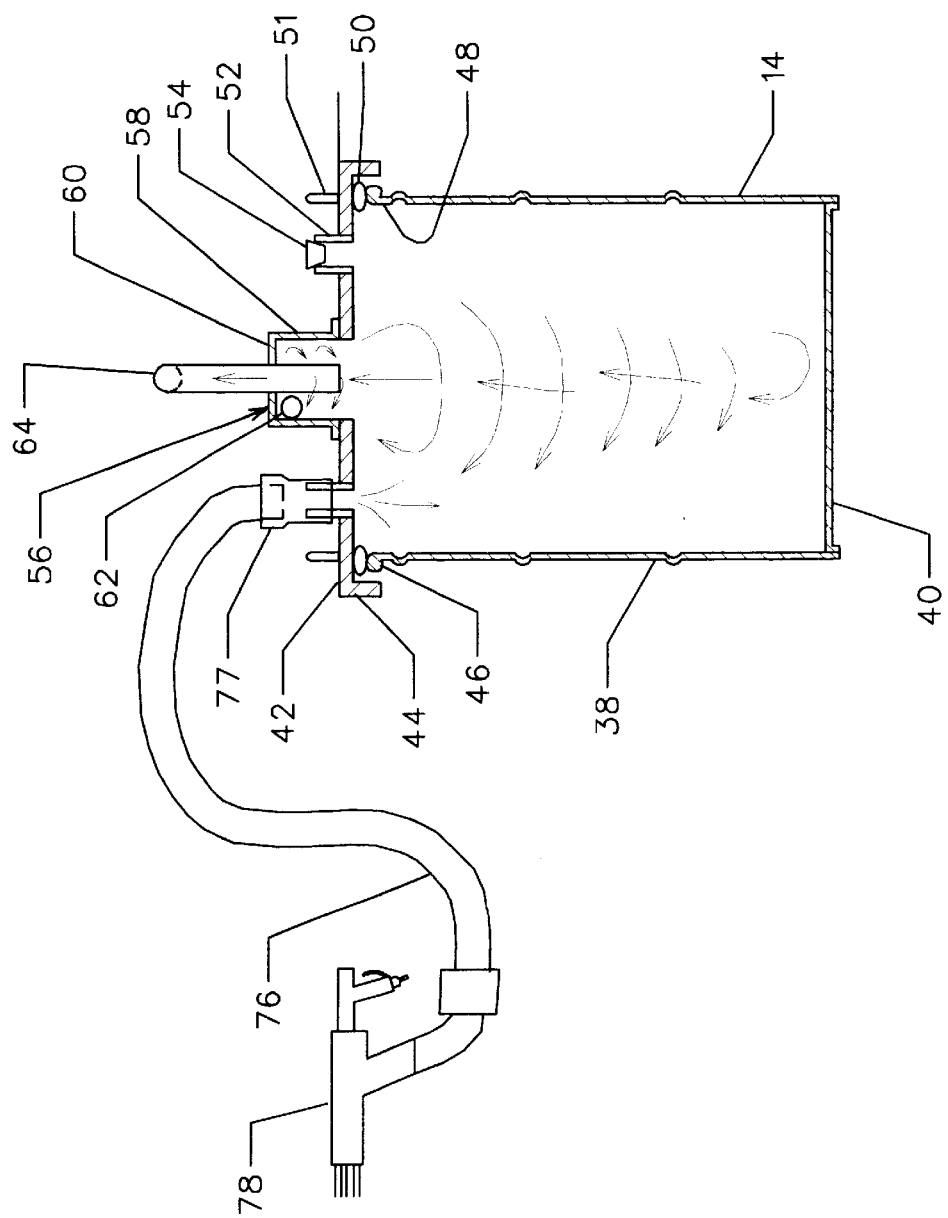
FIG. 2 is a cross-section of the first cyclonic drum of FIG. 1 having an inlet port connected to a hose connected to a needle gun.
Figure 3B:
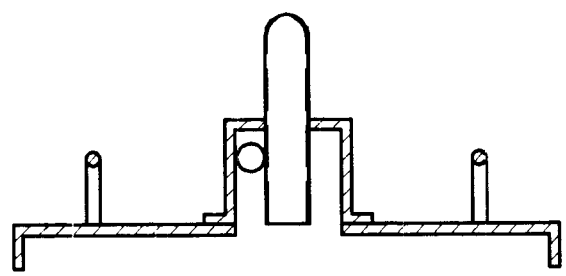
FIG. 3B is a cross-section along line 3B—3B of the small-diameter cyclone-producing head of FIG. 3A.
Figure 3A:
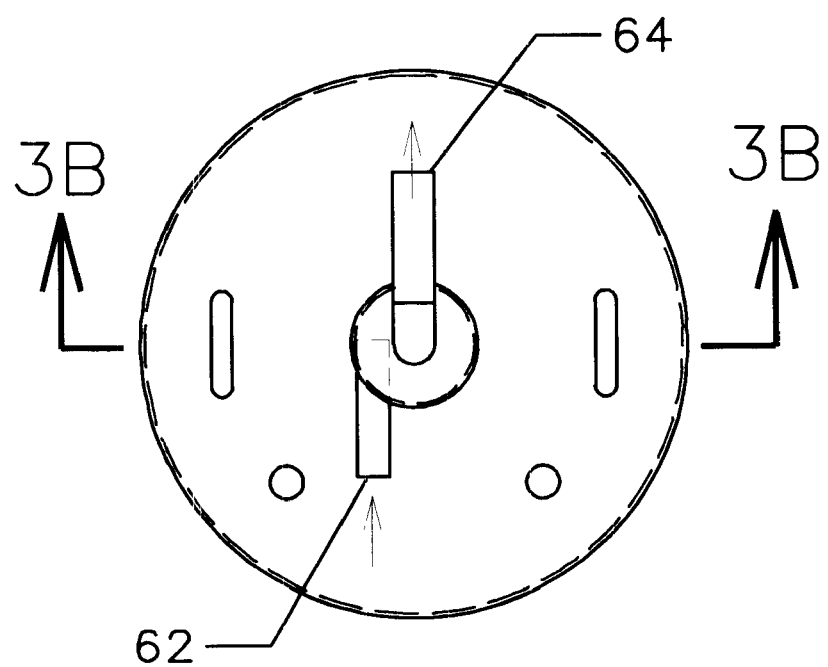
FIG. 3A is a top side view of a preferred small-diameter cyclone-producing head for the first cyclonic drum of FIG. 1.
Figure 4B:
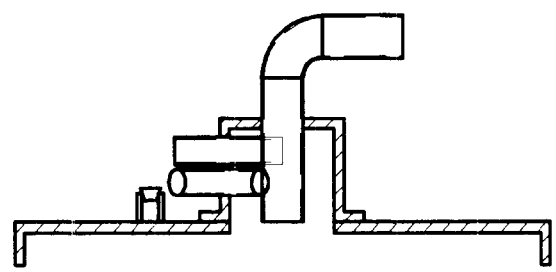
FIG. 4B is a cross-section along line 4B—4B of the cyclone-producing head of FIG. 4A.
Figure 4A:
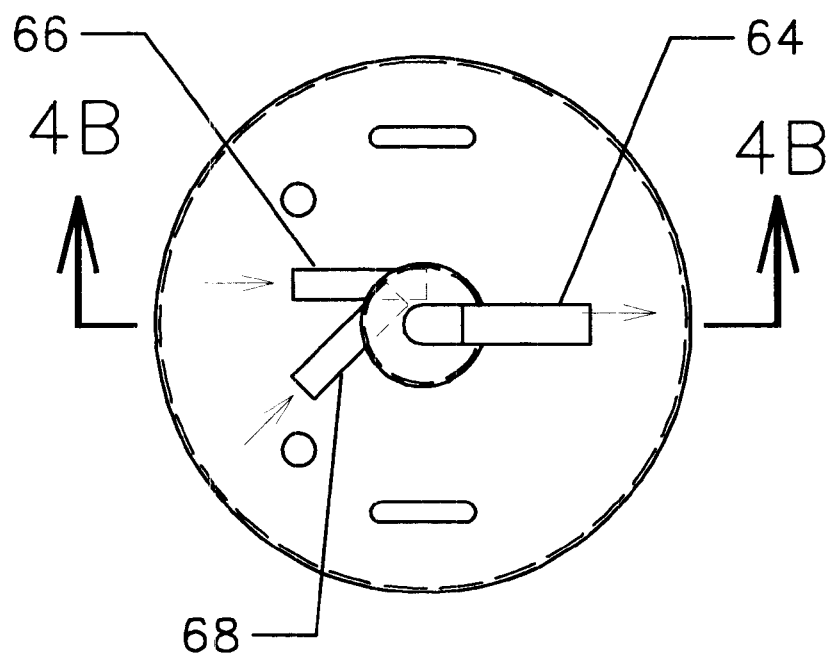
FIG. 4A is a top side view of an additional small-diameter cyclone-producing head for the first cyclonic drum of FIG. 1.

A preferred first cyclonic drum 14, shown in FIG. 2, is a 55-gallon cylinder made of steel, though drums of other shapes, sizes, and material compositions are useful. Drum 14 has a side-wall 38, a bottom wall 40, and a removable cover 42. Drum cover 42 has a curvy rim 44, which snuggly wraps around a flange 46 extending outwardly from edge 48 at the top end of drum 14. An annular gasket 50 seals the junction of cover 42 and flange 46 extending outwardly from edge 48 of side wall 38. Handles 51, mounted to the exterior of cover 42, facilitate lifting the cover off drum 14. Cover 42 has two inlet ports 52, whose function will be discussed below, and which are plugged by plugs 54 when not in use. Cover 42 has a centrally located small-diameter cyclone-generating head 56, with a side wall 58 and a top wall 60. Cyclone-generating head 56 has a cylindrical inlet port 62, positioned to feed contaminant-laden air tangentially to wall 58 of cyclone-generating head 56, and a cylindrical outlet port 64, centrally mounted to top wall 60 of the cyclone-generating head, and bent at an angle facilitating the departure of the cyclone, which head 56 generates, from cyclonic drum 14.

Pulled by a vacuum of about 90 inches of water (see below), produced by motors 28, contaminant-laden air 36 streams into cyclonic head 56, traces the contours of side wall 58 of the cyclonic head, and downwardly spirals producing a cyclone. This cyclone bolts into the first cyclonic drum 14, travels along the axis of the drum, reaches bottom wall 40 of the drum, wherein it deposits most of the contaminants it carries, bounces off and, more compressed than before, travels back to the cyclone-generating head 56, along the same axis of the drum 14, exits the cyclone-generating head, and enters second cyclonic drum 16. Because air stream 36 is extremely fast (due to the high vacuum pulling it), and the cyclone-generating head is very small (compared with the size of traditional cyclone-generators), the cyclone produced is extremely compressed, screw-shaped, packing huge centrifugal forces. And because this extremely powerful cyclone is launched directly into drum 14, a drum of considerable size, great amounts of contaminants are dispersed, indeed, tightly packed, into this drum per unit time. Thus, the present invention uniquely combines the great contaminant processing capacity of the compact, small-diameter cyclone with the storing capacity of the large drum to produce a collector uniquely capable of truly large-scale remediation.

Furthermore, extensive investigations have uncovered critical, performance-determining relationships between the geometry of cyclone-generating head 56 (see FIGS. 3A, 3B, 4A, 4B) and the geometry of the first cyclonic drum 14. For example, a cyclone-generating head 56 that is 5 inches high and 5½ inches wide, with an inlet port 62 outer diameter of 1½ or 2 inches and an outlet port 64 outer diameter of 2 inches, gives best results if mounted on a cylindrical drum of interior diameter greater than 10 inches. A cyclone-generating head 5 inches wide and 5.5 inches high, with two inlets 66 and 68, each 1½ inches in outer diameter, and an outlet of 2 inches in outer diameter, gives best results if mounted on a drum 14 which is at least 10 inches wide; such collector efficiently removes a variety of contaminant particles, in a variety of applications, including the detachment of paint and other materials from coated surfaces.

Figure 5:
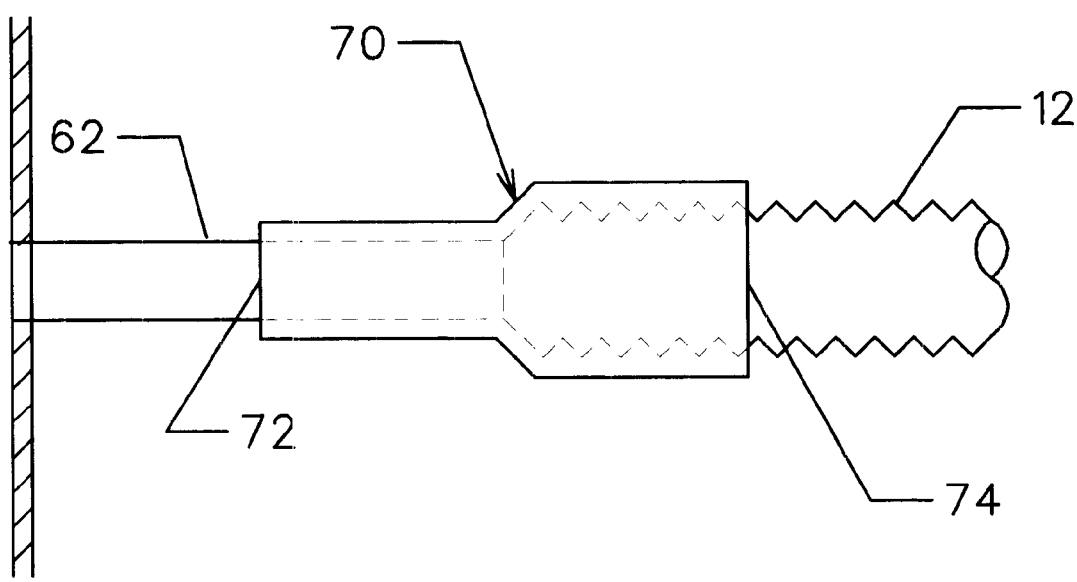
FIG. 5 is a perspective view of a vacuum hose connected to an inlet- or outlet port of FIG. 1.

Inlet port 62 of cyclone-generating head 56 is connected to vacuum hose 12 via an adapter or cuff 70 shown in FIG. 5. All inlets or outlets of vacuum collector 10 are connected to vacuum hoses by means of adapters 70. Adapter 70 has a small-diameter end 72 and a large-diameter end 74. Inlet 62 sealably slides into small-diameter end 72 of adapter 70, and vacuum hose 12 sealably slides into large diameter end 74 of adapter 70. Adapter 70 is preferably plastic, though other materials may also be used. Adapter 70 connects hose 12 to inlet 62 having an outer diameter of 1.5 inches, though other sizes may also be used. Adapters 82 and 86 connect hose 80 to outlet 64 and inlet 84 (FIG. 1); outlet 64 and inlet 84 have an outer diameter of 2 inches, though other sizes may also be used.

As shown in FIG. 2, each of inlet ports 52 on cover 42 of drum 14 can be connected to a vacuum hose 76 connected to a power tool, such as a needle gun 78, which removes coatings from surfaces; other useful power tools are a grinder, also used to remove coatings from surfaces, a wand, a crevice tool, and a squeegee, which are used in carpet cleaning. Inlet port 52 can have an outer diameter of 1.5 inches, though other sizes may be employed, depending on the nature of the cleaning job.

Second cyclonic drum 16 is connected to first cyclonic drum 14 through a hose 80 shown in FIG. 1. One end of hose 80 is connected to cyclone-generating head outlet 64 through adapter 82, as described above; the other end of hose 80 is connected to inlet port 84 of the second cyclonic drum through adapter 86. Various sizes of vacuum hose 80 can be employed; 2 inches in interior diameter is useful. Vacuum hose 80, vacuum hose 76 connected to inlet port 52 on cover 42 of drum 14 (FIG. 2), as well as vacuum hose 12, which is used to suck contaminants 32 into collector 10, are preferably plastic, though other materials, especially flexible materials facilitating the propagation of a cyclone, may advantageously be used.

Figure 6:
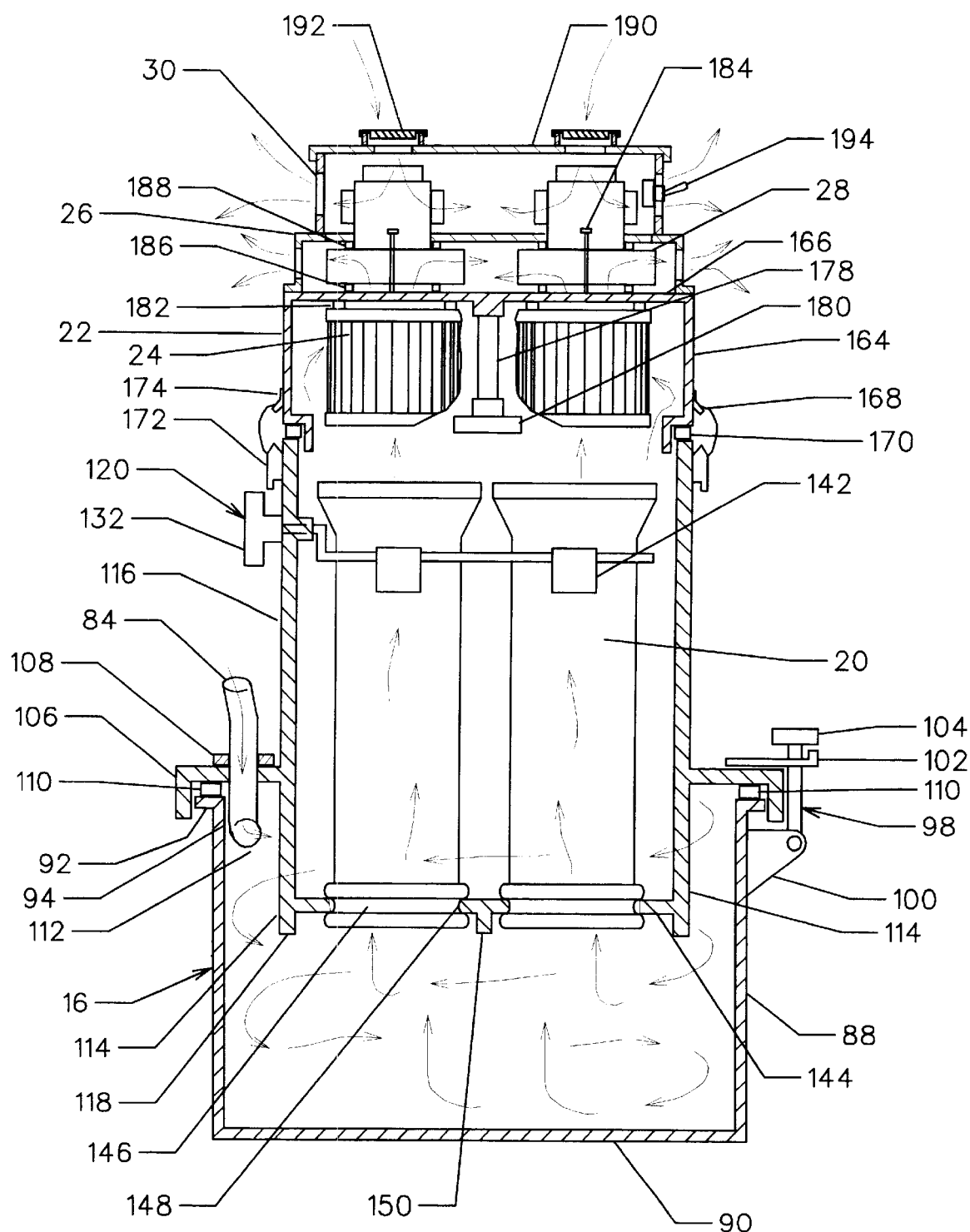
FIG. 6 is a cross-section of the second cyclonic drum of FIG. 1 having the primary filter housing containing filter bags, the HEPA filter housing containing a HEPA filter, and the covered motor housing containing two motors.

Turning to FIG. 6, the preferred second cyclonic drum 16 is cylindrical, made of steel, though other drums of various shapes and material compositions are also suitable. Second cyclonic drum 16 has a side wall 88 and a bottom wall 90; a drum 16 that is 13 inches high, 18 inches wide, and defines a volume of 10 gallons is useful, though various sizes can be accommodated. Drum 16 has a flange 92 extending outwardly from side-wall top edge 94; the function of this flange is discussed below. Drum 16 has two handles 96 (see FIG. 1) mounted to the outer surface of side wall 88 to facilitate emptying or transporting the drum. Drum 16 has an outer clamp 98, which secures the junction of the drum with primary filter housing 18 mounted on the drum. Clamp 98 comprises a lip 100 mounted to the outer surface of drum wall 88, a plate 102 bent at the end not touching primary-filter housing 18 and parallel to lip 100, and a screw 104 screwing lip 100 and plate 102 together. Inlet port 84, mounted on a flange 106 extending from primary-filter housing 18 (discussed in greater detail below), feeds contaminant-laden air coming from first cyclonic drum 14 into second cyclonic drum 16. Inlet port 84 is a steel pipe segment, 2 inches in outer diameter, bent to an aerodynamic shape approximating a semi-circle, experimentally found to best generate the desired cyclone within cyclonic drum 16. A flange 108, welded on the outer wall of inlet port 84, serves to securely mount the inlet port onto primary-filter housing flange 106, and a rubber gasket 110 between flanges 106 and 92 provides adequate sealing. As a result of shape and orientation, inlet port 84 sends a 2-inch-thick stream of contaminant-laden air tangentially to the inner side wall 88 of second cyclonic drum 16. This air stream is significantly compressed in a narrow cylindrical-shell space 112 defined by the interior of side wall 88 of second cyclonic drum 16 and a lower section 114 of the exterior of primary filter housing 18 extending into second cyclonic drum 16. Compressed, the air stream traces the contours of the interior of side wall 88 of the second cyclonic drum producing a powerful large-diameter cyclone, which spirals down the axis of the second cyclonic drum, reaches bottom wall 90, depositing most contaminants it carries therein, reverses course and, more compressed than before, ascends along the axis of the second cyclonic drum, passing through the primary filters 20 and HEPA filter 24 before exhausting through motors 28. It will be appreciated that space 112 forming this cyclone can be easily changed, e.g., by changing the shape or size of primary filter housing 18 or the shape or size of second drum 16, which change will produce a new cyclone, of different shape and contaminant-separating properties.

Primary filter housings of many shapes and sizes, made of various materials, are suitable for the present invention. A useful housing 18 (see FIG. 6) is made of cast aluminum and has a cylindrical wall 116, which is 15 inches wide, 23 inches high. Flange 106 of this housing 18 is about 8.5 inches above bottom edge 118 of wall 116. The function of flange 106 and of clamp 98 in securing primary filter housing 18 on second cyclonic drum 16 was discussed above.

Figure 7:
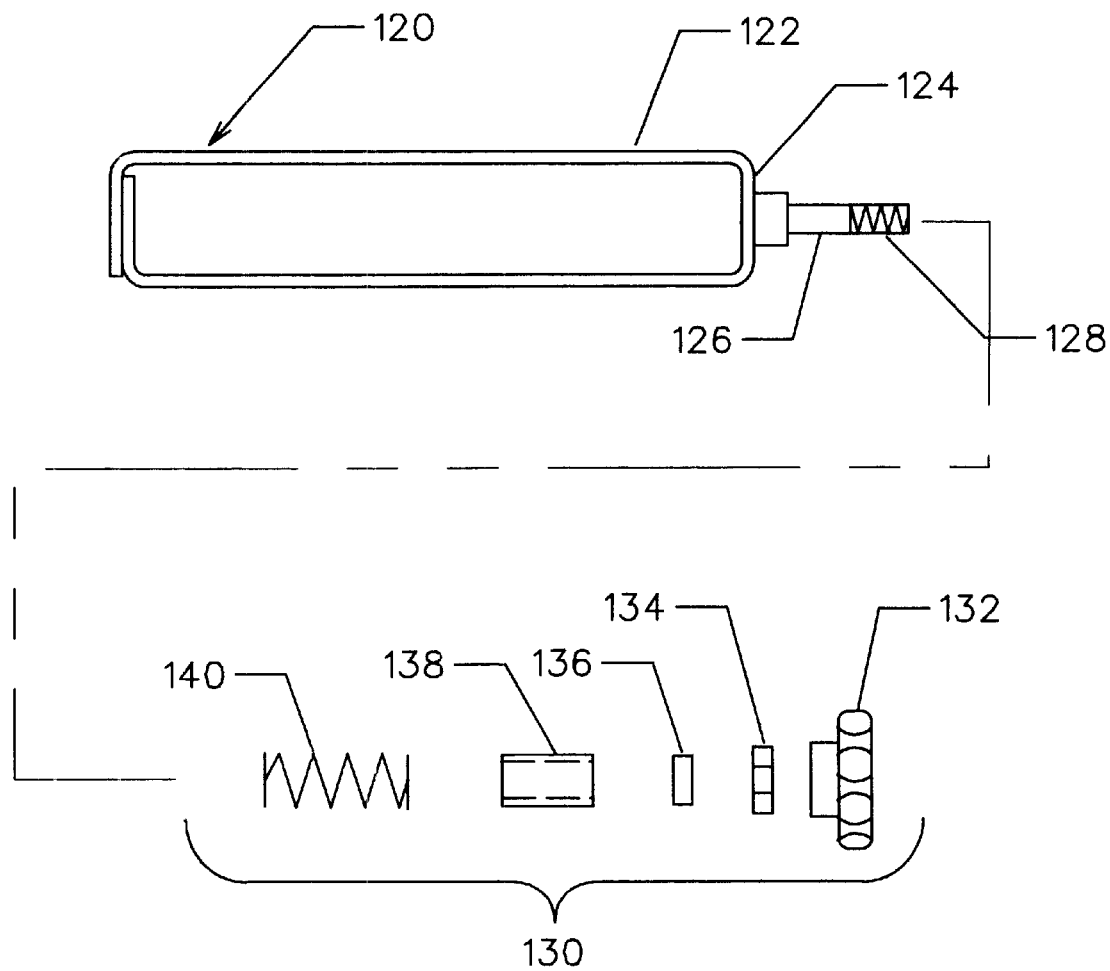
FIG. 7 is a top side view of the manual shaker of FIG. 1.

Preferably four primary filter bags 20 are within primary filter housing 18, although a different number of bags may be employed depending on the cleaning job; they stand upright by attachment to a manual shaker 120 shown disassembled in FIG. 7. Manual shaker 120 is a metallic rod bent into a rectangle 122, 8 inches by 2 inches. To the mid-point of short side 124 of rectangle 122 is connected a rod 126 with a threaded end 128, to which a knob assembly 130 is screwed. Knob assembly 130 consists of a knob 132, preferably made of aluminum, a disc lock nut 134, a seal 136, a brass bushing 138, and a spring 140. Primary filter bags 20 are firmly attached to rectangle 122 by means of elastic loops 142 mounted to the outer surfaces of bags 20 (see below for more details on these loops). Abrupt oscillatory movement of bags 20 using knob 132 shakes off contaminants trapped on the interior surface of the bags.

As shown in FIG. 6, bags 20 fit into circular openings 146 on bottom wall 144 of primary filter housing 18, which wall is located in lower section 114 of the housing. Bags 20 have clefts 148, which sealably snap onto bottom wall 144 (inside the circular openings 146) enabling the bags to stand upright. (Clefts 148 are discussed in greater detail below.)

Figures 8A, 8B:
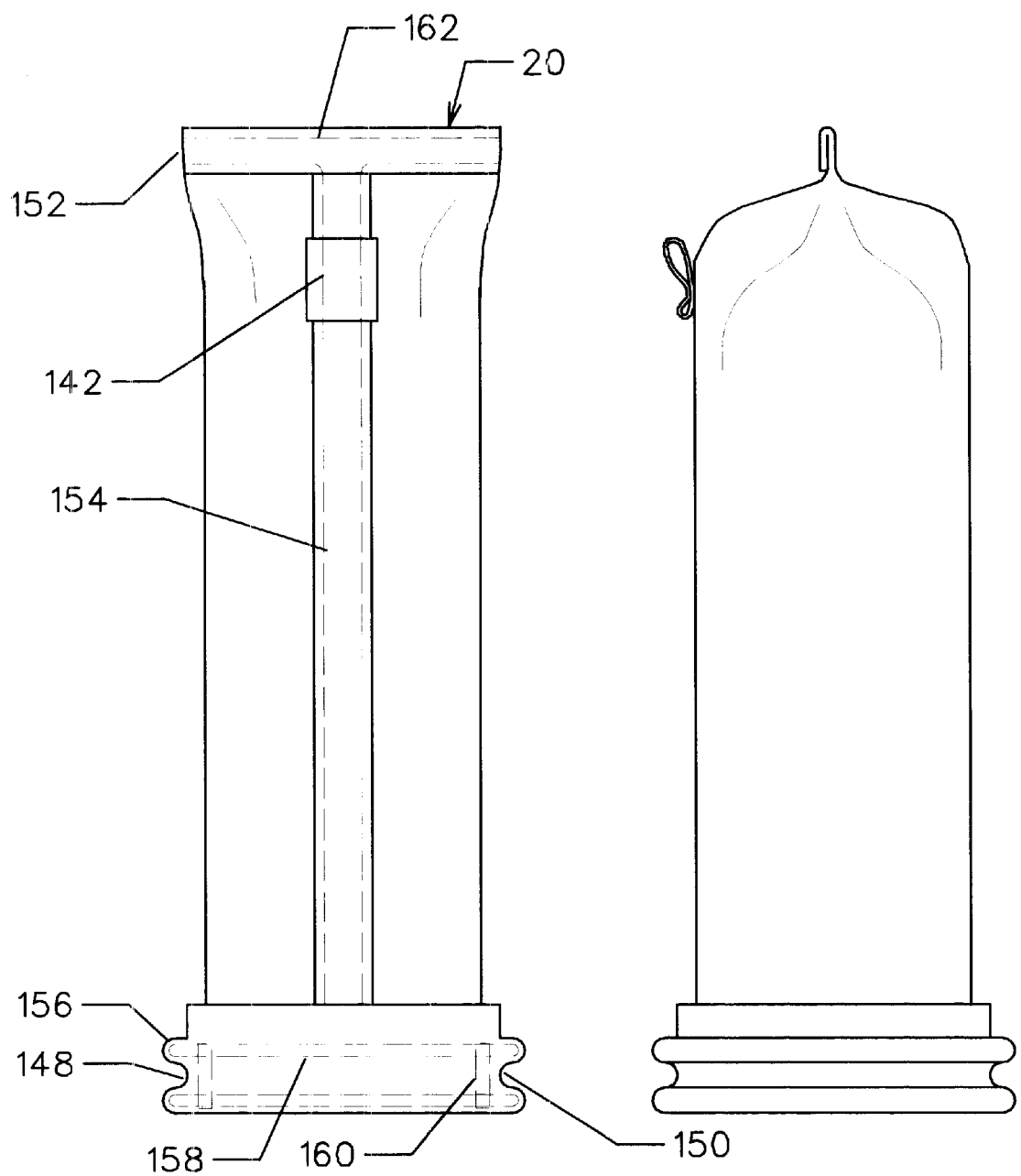
FIG. 8A is a front side view of the primary filter bag of FIG. 1.
FIG. 8B is a right side view of the primary filter bag of FIG. 8A.

Primary filter bags made of materials known in the art, such as cotton, wool, nylon, acrylic, polypropylene, polyethylene, fluoropolyethylenes, fiberglass, polyesters, etc., (see Design of Industrial Ventilation Systems, J. L. Alden and J. M. Kane, Industrial Press Inc., New York, N.Y., 1982), with or without prior chemical pretreatment, are useful, depending on the desired environmental remediation. A preferred, widely applicable material is 16-ounce singed polyester felt, which captures at least 99% of particles over 1 micron in diameter on the singed side of the felt. Sheets of this material are folded and sewn into bags using techniques known in the art. Cylindrical bags having the singed face inside the bag are preferred. FIG. 8 shows a folding pattern producing a preferred cylindrical bag 20, which is 22 inches in height, 5 inches in diameter, 314 square inches in area. This bag has (a) a doubly sewn, 2-inch-wide fold 152 at the top, (b) a triply sewn (or, alternatively, thermally sealed) ¾-inch-wide seam 154 running along the axis of the cylinder, and (c) a 2-inch long, ¾-inch wide elastic loop 142 sewn to seam 154 and positioned near fold 152; the use of loop 142 to support bag 20 in manual shaker 120 was discussed above. At the bottom, bag 20 contains a nylon sheath 156 having cleft 148. As discussed above, clefts 148 snap onto bottom wall 144 of primary filter housing 18 to secure the bags in upright position and provide a sealing engagement of the bags to the primary filter housing. Cleft 148 is formed by closely spaced felt-strip bundles 158 held together by stainless steel bands 160 and encased in nylon sheath 156.

Bag seams 154, and all needle-holes on the bag, e.g., needle holes 162 on fold 152, are sealed with 100% silicon caulking, such as that manufactured by Dow Chemical, Midland, Mich. Primary filter bags 20 may contain sewn grounding wires in order to minimize damage to the bag by static electricity, which may occur with certain types of contaminants.

Generally speaking, the life-time of primary filter bags 20 is a function of the physicochemical properties, determined by particle size and chemical nature, of the contaminants trapped by the bags. Decreasing particle size or increasing particle chemical reactivity decreases the life-time of primary filter bags. For example, in one study, 5,000 pounds of extremely fine, lead-containing dust, generated by sandblasting rusty bridges, were collected by the polycyclonic collector without sufficient damage to the primary filters to warrant filter-change. Generally, when contaminants pass through the bag in sufficient amounts to cause HEPA filter clogging, the bags must be replaced.

HEPA housing 22 is preferably made of cast aluminum, though other materials may be used. As shown in FIG. 6, HEPA filter housing 22 has a cylindrical side wall 164 and a top wall 166. HEPA housing wall 164 bends inwardly at the bottom to form a flange 168, which enables the HEPA filter housing to slide into primary filter housing 18. The junction of HEPA filter housing flange 168 and primary filter housing 18 is sealed by an annular gasket 170. A spring latch 172, mounted to the outer wall of primary filter housing 18, and a lip 174, mounted to the exterior of HEPA housing wall 22, cooperate to hold the primary filter housing in sealing engagement with the HEPA filter housing.

Figures 9A, 9B:
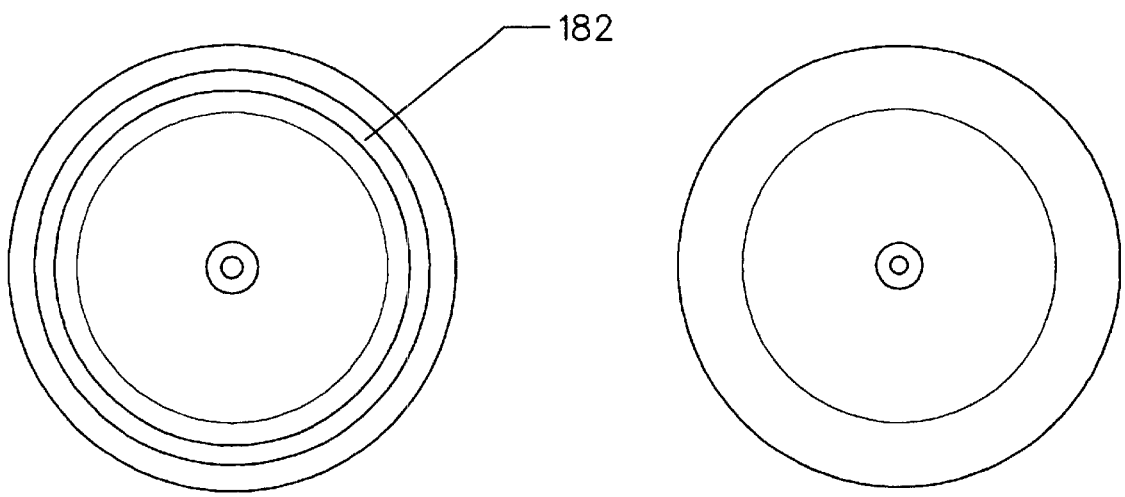
FIG. 9A is a top side view of the HEPA filter of FIG. 1.
FIG. 9B is a bottom side view of the HEPA filter of FIG. 1.
Figure 9C:
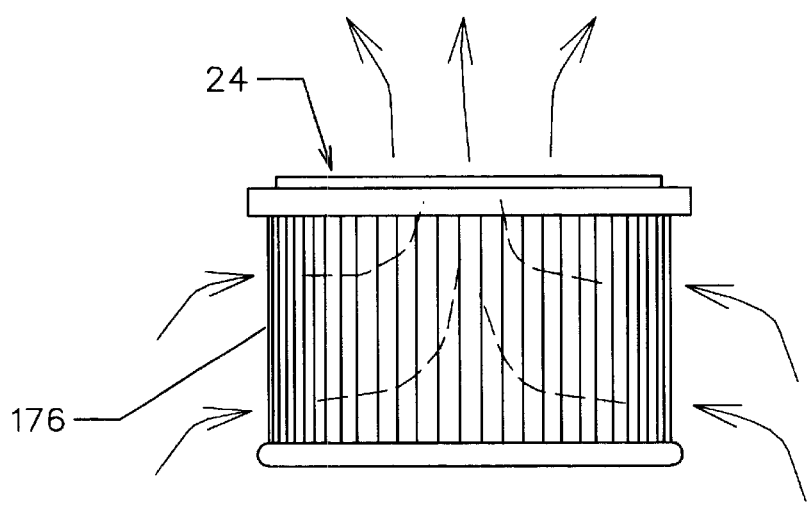
FIG. 9C is a front side view of the HEPA filter of FIG. 1 showing the direction of airflow through the filter.

The preferred HEPA filter 24, shown in FIGS. 9A, 9B, and 9C, is also cylindrical, with an outer diameter of 11.875 inches and a height of 4.875 inches, though filters of other configurations or sizes may be used. HEPA filter 24 comprises closely spaced filter pleats 176. As shown by FIG. 6, HEPA filter 24 is mounted to the interior of top wall 166 of HEPA housing 22 and supported by a stud 178 with a plastic retaining knob 180 at its end. An annular gasket 182 of internal diameter of 9 inches, preferably ¼-inch-thick, provides adequate sealing between HEPA filter 24 and HEPA housing top wall 166. HEPA filter 24 permits an air flow of 200 cubic feet of air per minute. (Air enters cylindrical HEPA filter 24 sideways, as shown in FIG. 9C.) This HEPA filter is certified to capture at least 99.97% of contaminant particles greater than 0.3 micron in diameter. This HEPA filter is manufactured by Airguard, Lousiville, Ky. Among other things, the life-time of HEPA filter 24 is a function of contaminant-particle physicochemical properties.

Vacuum-producing motors 28, shown in FIGS. 1 and 6, are mounted on the exterior of top wall 166 of HEPA filter housing 22. Motors 28 are inside motor housing 26, which is bolted to top wall 166 of HEPA filter housing 22 by bolts 184. Annular sponge-type gaskets 186 and 188 hold the motors in sealing engagement to the HEPA filter housing 22 and to motor housing 26. Motor-housing cover 30 is cylindrical, with a top wall 190; it covers the parts of motors 28 outside motor housing 26. Motor housing cover 30 has louvers 192 on top wall 190 which enable motors 28 to cool. Motor housing 26 has an on/off switch 194 for motors 28. Motor housing cover 30 and motor housing 26 are made of steel. Motors 28 have a combined power of 2.8 hp and are built by Ametek Corp., Lamb Motor Division, Kent Ohio; they generate a vacuum of 90.5 inches on the water column gauge and an air flow of 205 cubic feet of air per minute; they are noisy to the tune of 83 decibels at a distance of 6 feet from the motors.

6.2. Additional Embodiment

Figure 10:
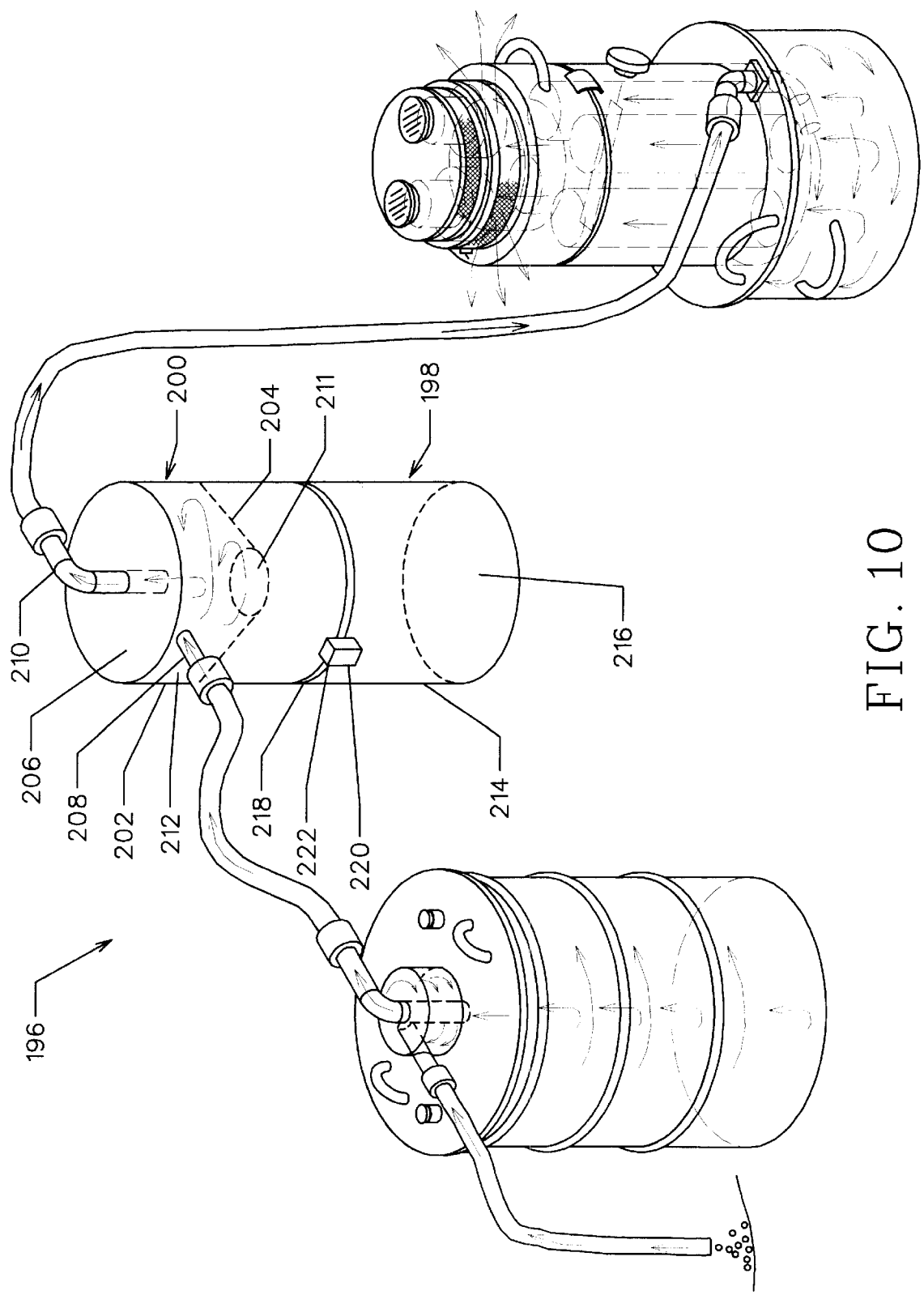
FIG. 10 is a perspective view of an additional embodiment of the polycyclonic collector of the present invention comprising three cyclonic drums.
Figure 11:
FIG. 11 is front—as well as associated top perspective views of three prior art cyclone generators, which are suitable for the middle cyclonic drum of FIG. 10.
Figure 11:
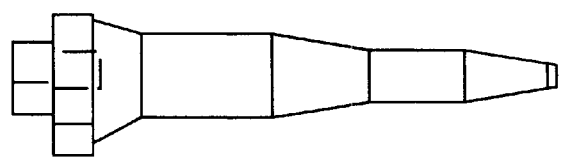
Figure 11:
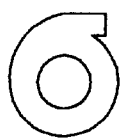
Figure 11:
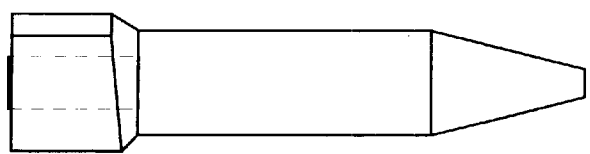
Figure 11:
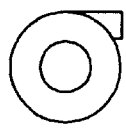
Figure 11:

Additional embodiment 196 of the present invention, shown in FIG. 10, is the preferred embodiment of FIG. 1 with this difference: interposed between and communicating with first and second cyclonic drums 14 and 16 is a cyclonic drum 198 taken from the prior art. Cyclonic drum 198 has a cyclone generator 200. The cyclone generator 200 shown in FIG. 10 has a helical roof; it is a prior art cyclone generator and can, e.g., be replaced by any of the prior art cyclone generators shown in FIG. 11. Helical-roof cyclone generator 200, as well as those of FIG. 11, are discussed in Design of Industrial Ventilation Systems, J. L. Alden and J. M. Kane, Industrial Press Inc., New York, N.Y. 1982. Cyclone generator 200 of FIG. 10 has a side wall with a cylindrical upper section 202 and a conical lower section 204, a top wall 206, an inlet port 208, a bent outlet port 210, and a helical roof 212 inside the space defined by cylindrical upper section 202. Conical lower section 204 has an opening 211 enabling cyclone generator 200 to communicate with drum 198. Cyclone generator 200 is mounted on drum 198, which has a cylindrical side wall 214 and a bottom wall 216. The junction of the cyclone generator and the drum is sealed by a gasket 218. Latches 220 mounted to the exterior of drum side wall 214, and lips 222, mounted to the exterior of cyclone generator 200, cooperate to secure the junction of cyclone generator 200 and drum 198.

6.3. Alternative Embodiment

Figure 12:
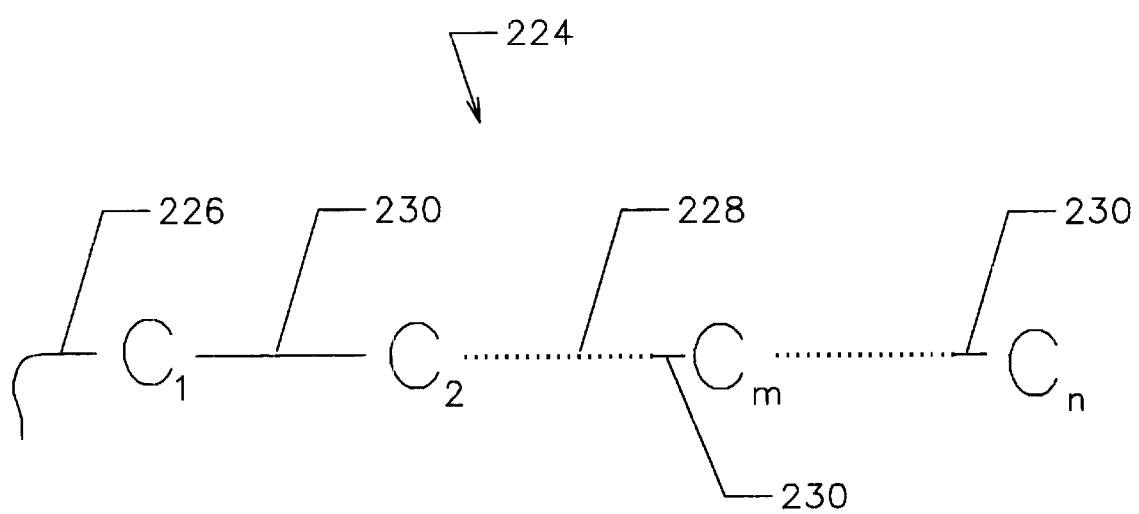
FIG. 12 shows, in symbolic form, an alternative embodiment of the polycyclonic collector comprising more than three cyclonic drums.

Alternative embodiment 224 shown in FIG. 12 modifies the preferred embodiment of FIG. 1 by interposing between and connecting with first cyclonic drum 14 and second cyclonic drum 16 n−2 communicating cyclonic drums, where n is an integer greater than 3. In FIG. 12, $C_1$ represents the first cyclonic drum 14 of FIG. 1 connected to a vacuum (suction) hose 226; $C_n$ represents the second cyclonic drum 16 of FIG. 1 carrying the stack of (a) primary filter housing 18 containing primary filter bags 20, (b) HEPA filter housing 22 containing HEPA filter 24, (c) motor housing 26 containing motors 28, and (d) motor cover 30. Cyclonic drums $C_2$ and $C_m$ are known in the art, e.g., they can be assembled using drums and the cyclone generators of FIG. 11. Dots 228 between symbols $C_2$ and $C_m$, and between $C_m$ and $C_n$ represent additional prior art cyclonic drums, which are part of the chain of communicating cyclonic drums of the polyccyclonic assembly 224. Lines 230 represent pieces of hose, similar to the hose segment 80 in FIG. 1, connecting the outlet of one cyclonic drum with the inlet of another, through the agency of suitable adapters, e.g., adapters 70, 82, and 86 shown in FIG. 1.

6.4. Operation—FIGS. 1, 10, 12

Motors 28 pull air out of the polycyclonic collector producing a sub-atmospheric pressure or vacuum inside the collector. This enables vacuum hose 12 to suck contaminants off a surface sending a stream of contaminant-laden air into cyclone-producing head 56. A small-diameter cyclone packing great centrifugal forces forms therein. The cyclone axially descends to the bottom of the drum below depositing up to 95% or more of the contaminants it carries (exact amount depends on contaminant particle-size, -shape, and density). Upon hitting the bottom of the drum, the cyclone reverses course and, more compressed than the cyclone that descended, axially ascends back to the cyclone producing head 56, exits through outlet port 64, and enters the second cyclonic drum in the collector. In the second cyclonic drum, the steps of (a) new cyclone formation, (b) cyclone descent and compression, (c) cyclone ascent to the top of the drum, and (d) cyclone exit are repeated, until the air stream enters the last cyclonic drum of the collector. Here the air stream spins into a (new) large-diameter cyclone, which removes most of the remaining contaminants from the air stream depositing them in the drum. The air stream, significantly cleaned by the repeated cyclonic action, finally passes through primary filters 20, through HEPA filter 24, and exhausts, essentially contaminant-free.

Contaminants captured by the primary filter bags are easily dislodged by shaking the filters using knob 132 of manual shaker 120 (FIG. 6) as described above, after turning off the vacuum-producing motors 28. Shaking once every hour, for finely divided solid contaminants, e.g., dusts, or once every several hours for coarser solids, e.g., paint chips, is usually sufficient to keep the primary filters operational for extended periods of time. The only other routine interruption of operation of the collector is to empty drums—emptying involves turning off the vacuum-producing motors, removing the cover with the cyclone-producing head from drum 14, or the stack of primary filter housing 18, HEPA filter housing 22, and covered motor housing 26 from drum 16, and emptying the drum.

Based on the aerodynamic and chemical properties of the contaminants to be removed, a polycyclonic collector can be put together, which will efficiently and safely remove the contaminants, with control over pace of cleaning, frequency of filter cleaning, frequency of filter change, ultimately, with control over the duration and cost of the remediation. For example, three cyclonic drums are useful, if the contaminants are a dust; three drums may also be useful if valuable filters must be preserved; two drums, e.g., the preferred collector of FIG. 1, generally give excellent results-prolonged operation, excellent vacuum, infrequent filter changes-with most solid contaminants encountered in the field of environmental remediation.

6.5. Advantages

Many objects and advantages of the invented vacuum collector are now evident, including:

1. Employment of multiple cyclones, of variable selectivities, working cooperatively to clean the same contaminant-laden air stream. Thus, among other innovations, the novel polycyclonic collector harnesses the powerful synergistic effect of multiple cooperating cyclones, discussed in section 6.6, to most efficiently clean contaminant-laden air.

2. Novel, aerodynamically-optimized, small-diameter heads mounted on large drums, producing and propagating extremely compressed, powerful cyclones. Thus, the high contaminant-processing capacity of the small-diameter cyclone is uniquely combined with the high contaminant storing capacity of the large drum, to produce a cyclonic drum isolating large amounts of densely packed contaminants per unit time.

3. A novel, aerodynamically-optimized, large-diameter cyclone generator, comprising a specially-shaped inlet port, which tangentially feeds a contaminant-laden air stream into a narrow cylindrical-shell-shaped chamber formed by the side wall of a primary filter housing positioned inside a drum and the side wall of this drum.

4. Primary filter bags made of singed polyester felt, with the singed face of the felt inside the bags, capable of filtering off better than 99% of contaminant particles over 1 micron in diameter for extended periods of time.

5. Most proximate disposition of contaminant collection chamber, cyclone chamber, primary filters, and HEPA filters. This maximizes collector performance by harnessing the powers of proximity and Simplicity discussed in section 6.6.

6. Virtually nonstop, inexpensive environmental remediation, including collection of lead- and chromium-containing paint dust generated by the sandblasting of bridges. Increasing the number, especially the number and type, of cyclones employed in the polycyclonic collector dramatically increases the purity of the air going through the filters of the collector, stretching the life-time of the filters. Since filter change and maintenance are very expensive and disruptive, the invented polycyclonic collector enables virtually nonstop and inexpensive environmental remediation.

7. Safety. The operator of the vacuum collector, and the area around the operator, are not exposed to the harmful contaminants being removed, because the air the collector discharges is essentially contaminant-free, and because collector filters can be cleaned without exposing the operator to the contaminants adhering on the filters.

8. Simple, modular design and construction. This enables easy modification of an old collector to meet new job requirements. This also results in a highly mobile collector for the cleaning of hard-to-reach sites (e.g., hilly, rocky, precipitous sites, etc.).

9. High durability, because the polycyclonic collector has no continuously moving components, other than the parts of the vacuum-producing motors.

10. Maximum Design and Construction Economy with respect to cleaning and storing contaminants, since all collector components clean air and store contaminants. Maximum design and construction economy results in (1) high efficiency, (2) high capacity, (3) low machine complexity, (4) low purchase price, and (5) low maintenance cost.

11. Widespread applicability. With unprecedented performance and versatility, the invented polycyclonic collector enables the remediation of land polluted with hazardous or toxic materials in many fields, e.g., in industry, in research laboratories, in construction and maintenance, in mining, in energy production, land contaminated by hazardous or toxic dumping, spilling, etc. It also enables decontamination of vehicles, machines, as well as people exposed to contaminants.

Materials that the polycyclonic collector can easily remove include lead dust, saw dust, other dusts, sands, materials used in sandblasting, asbestos, asbestos-containing mixtures, plaster, paint chips, gravel, metal shot and grit, mixtures containing toxic chemicals, mercury, mercury-containing mixtures, boiler slag, dirt.

Thus, a novel polycyclonic collector has been invented, which is used to save the environment, protect health, and insure enforcement of federal environmental laws.

6.6. Theory of Design and Operation

The superior performance of the polycyclonic vacuum collector was most unexpected, and the synergy of forces behind this performance has not been completely elucidated as yet. Nevertheless, several scientific principles were employed in the design of the polycyclonic collector and are believed to contribute to its superior performance.

One principle concerns the properties of extraction, a technique widely used in the field of chemistry and a relative of cyclonic separation. Extraction is the separation of a desirable substance from a mixture of substances. Typically, during an extraction experiment, a solution of a mixture of substances is shaken with a imiscible solvent able to dissolve the desirable substance; the desirable substance passes (is extracted) into the imiscible solvent; and after evaporation of the imiscible solvent the desirable substance is isolated relatively free of the other substances of the mixture. Experiments show that extracting twice with, e.g., 1 gallon of imiscible solvent each time more efficiently isolates the desirable substance than extracting once with 2 gallons of imiscible solvent. In other words, combined multiple extractions are more efficient than a corresponding single extraction.

Cyclonic separation applied to a stream of contaminant-laden air is analogous to the liquid extraction of a dissolved mixture of substances: the cyclone uses centrifugal force to separate (extract) contaminants from the mixture of contaminants and air, the way a liquid extraction uses chemical power to extract a desirable substance from a dissolved mixture of substances. Therefore, many cyclones linked in series should be more effective in removing contaminants from contaminant-laden air than corresponding few cyclones, e.g., three linked cyclones should be more efficient than a corresponding pair of linked cyclones, a pair of linked cyclones should be more efficient than a corresponding single cyclone, etc. The present invention makes use of this insight by employing serially linked, multiple cyclones to remove contaminants from contaminant-laden air. In addition to cyclone multiplicity, the present invention varies the cleaning selectivity of the cyclones to produce a polycyclonic collector of maximum overall cleaning efficiency.

Another important principle, which the present invention deliberately employs, is more subtle, yet well known in the physical and biological sciences. This principle states that Proximity (togetherness) of cooperating modules in a modular system endows the system with great power.

For example, proximity effects account for much of the power of biological systems. In the case of proteins and genetic materials, proximity of structural modules making up these materials accounts for much of their ability to power (catalyze) difficult biological processes. If these structural modules were distant, proteins and genetic materials would be useless, and life impossible.

Another, less exotic example involves the automobile assembly line. Here, the distance separating two teams of collaborating workers is very important: increasing it, beyond an optimal length, reduces the efficiency of the assembly line. Similarly, proximity, in particular precise separation and precise orientation, of robot attaching a part to the car being assembled and the car is critical: without it the assembly line cannot operate.

The present invention harnesses the power of Proximity, by combining cyclonic action and contaminant storage within the same space, by positioning primary as well as HEPA filters closely and directly above a cyclonic chamber to quickly catch the cyclone ascending from the chamber, and by aerodynamically shaping key collector components, e.g., inlet and outlet ports, to conform to the shape of the cyclones generated, thus facilitating cyclone propagation within the collector.

A third principle, which the present invention carefully employs, is even subtler. This is the principle of Simplicity. Simplicity carries great power. In the world of physics, all natural laws are very simple mathematical relationships. And in the world of machines, simplicity makes fewer things go wrong, which results in greater durability, easier maintenance, greater usefulness.

Application of these principles—Repetition, Proximity, Simplicity—in the design of a novel vacuum collector for tailored environmental remediation contributed to the invention of the present polycyclonic collector.

6.7. Conclusion, Ramifications, and Scope

A novel vacuum collector has been developed on the basis of extensive experimentation, prototype-building and testing, and certain scientific principles. This vacuum collector employs novel, small- and large-diameter cyclones, as well as designed primary and HEPA filters. The cyclones of the collector work cooperatively and significantly clean contaminant-laden air before the filters of the collector filter the air; thus, required filter cleaning is infrequent and filter life-time extended. Additional advantages of the invented polycyclonic collector include:

1. Aerodynamically-optimized cyclonic-drum inlet and outlet ports facilitating generation and propagation of powerful cyclones.

2. Maximum Design and Construction Economy resulting in (a) high efficiency, (b) high capacity, (c) low machine complexity, (d) low purchase price, and (e) inexpensive maintenance.

3. Relatively inexpensive, non-stop environmental remediation

4. Remote, easy, and safe filter cleaning.

5. Safety, for the operator and those nearby.

6. Simple, modular design and construction enabling high operational flexibility, mobility, and remediation of contaminated areas which are normally inaccessible.

7. High durability.

8. Broad applicability including remediation in industry, in research laboratories, in construction, in mining, in energy production, and elsewhere, remediation of land harmed by dumping, spilling, etc, decontamination of vehicles, machines, and people exposed to contaminants, etc. Contaminants easily removed by the polycyclonic collector comprise dusts, sands, asbestos, mixtures of toxic substances, metallic particles, toxic solid-liquid mixtures, etc.

Thus, a novel polycyclonic collector has been invented, which saves the environment, protects health, and insures enforcement of the environmental laws.

Although this description contains specificities, these should not be construed as limiting the scope of the polycyclonic vacuum collector, but only as illustrative embodiments. For example, the primary filter housing of the polycyclonic collector may contain not one but two or more types of primary filters, or the collector may contain an additional filter-housing containing special filters, such as chemically reactive filters capable of removing chemical substances from the air stream before it exhausts through the motors. (Alternatively chemically reactive filters may take the place of the primary filters of the collector, if necessary.) Manual shaking, using shaker 120, may also be replaced by pulse-jet cleaning using compressed air tanks incorporated in the primary filter housing, e.g., as described in Design of Industrial Ventilation Systems, J. L. Alden and J. M. Kane, Industrial Press Inc., New York, N.Y. 1982, as well as in U.S. Pat. No. 4,820,315.

Therefore, the scope of the present invention should be determined by the appended claims, and their legal equivalents, rather than by the examples given.

We claim:

1. A vacuum collector for cleaning contaminated surfaces comprising
   (a) a plurality of drums, each drum having a side wall, a bottom wall and a cover, comprising
      (1) an inlet for admitting contaminant-laden air into said drum,
      (2) means for spinning said contaminant-laden air into a cyclone, which separates part of said contaminants from said air depositing it in said drum for storage, and
      (3) an outlet for expelling air free of said part of said contaminants from said drum,
   (b) a first vacuum hose segment for sucking contaminants off said contaminated surfaces,
   (c) one or more second vacuum hose segments for fluidically interconnecting said drums by connecting said inlet of one of said drums to said outlet of another of said drums,
   (d) a primary filter housing containing primary filters,
   (e) a HEPA filter housing containing a HEPA filter, and
   (f) means for producing a vacuum,
      said drums being fluidically interconnected by said second vacuum hose segments in a series, which has an initial drum and a final drum, said inlet of said initial drum being connected to said first vacuum hose, said vacuum-producing means being mounted on said HEPA filter housing containing said HEPA filter, said HEPA filter housing containing said HEPA filter being mounted on said primary filter housing containing said primary filters, said primary filter housing containing said primary filters being mounted on said final drum and serving as said cover, said vacuum-producing means producing a sub-atmospheric air pressure within said interconnected drums and generating an airflow thereto, which airflow picks up said contaminants from said contaminated surfaces, enters said initial drum through said first vacuum hose segment, spins into said cyclone depositing contaminants therein, reaches said initial drum outlet, sequentially enters each of said drums in said series spinning and depositing said contaminants therein, ultimately arrives at said final drum, spins into said cyclone, deposits contaminants, passes through said primary filters, through said HEPA filter, through said means for producing a vacuum and into the atmosphere, whereby said contaminants from said surfaces are efficiently picked up by said airflow and efficiently deposited in said drums as a result of repeated cyclonic treatments so that said airflow is significantly free of contaminants when it passes through said primary filters and through said HEPA filter,
and whereby said collector can perform large-scale environmental remediation virtually nonstop, without frequent filter cleaning or filter changing.

2. The vacuum collector of claim 1 wherein the number of drums in said series of fluidically communicating drums ranges from three to five.

3. A method of cleaning contaminated surfaces comprising the steps of
   (a) using means for producing a vacuum to suck air laden with contaminants from said contaminated surfaces into an initial drum in a series of two or more fluidically communicating drums, said series also having a final drum, each of said drums in said series having means for spinning contaminant-laden air into a cyclone, as well as an inlet and an outlet, said inlet of one of said drums fluidically communicating with said outlet of another of said drums thus forming said series of fluidically communicating drums,
   (b) spinning said contaminant-laden air sucked in said initial drum into said cyclone,
   (c) depositing part of said contaminants in said initial drum as a result of the action of said cyclone partially cleaning said contaminant-laden air,
   (d) passing the partially cleaned air through said outlet of said initial drum into the next fluidically communicating drum in said series,
   (e) spinning said partially cleaned air into said cyclone depositing more of said contaminants in said next fluidically communicating drum, further cleaning said partially cleaned air, (f) ultimately passing the repeatedly cleaned air into said final drum of said series of fluidically communicating drums, (g) spinning said repeatedly cleaned air into said cyclone depositing more of said contaminants in said final drum, (h) passing said air from said cyclone in said final drum through primary filters, (i) passing said air from said primary filters through a HEPA filter and (j) exhausting said air from said HEPA filter through said means for producing a vacuum whereby large-scale environmental remediation is performed efficiently, safely, virtually non-stop, without frequent cleaning or changing of filters.

4. A vacuum collector for picking up contaminants off a surface comprising (a) a first cylindrical drum having a side wall, a bottom wall, and a cover, said cover of said first drum having a cylindrical cyclone-producing head, which communicates with said first drum and has a side wall, an inlet port for admitting contaminant-laden air along a path tangential to the head side-wall, and an outlet port, said inlet port of said head being connected to a first vacuum hose segment, which picks up said contaminants off said surface, (b) a second cylindrical drum having a side wall, a bottom wall, and an inlet port for admitting contaminant-laden air from said first drum along a path tangential to the second drum side-wall, said second drum being fluidically connected to said first drum by a second vacuum hose segment, which has one end connected to said outlet port of said first drum and the other end connected to said inlet port of said second drum, (c) a primary filter housing having a side wall and mounted on and extending in said second drum co-centrically, such that the lower part of said side wall of said primary filter housing forms a chamber with the upper part of said side wall of said second drum, which chamber communicates with said inlet port of said second drum and functions as a cyclone chamber, forming cyclones of diameter greater than that of the cyclones formed by said cyclone-producing head of said first drum, (d) a HEPA filter housing, containing a HEPA filter, mounted on said primary filter housing, and (e) vacuum-producing-means housing containing vacuum-producing means mounted on said HEPA filter housing, said vacuum-producing means produces a sub-atmospheric pressure within said collector generating an airflow thereto, which airflow sweeps said contaminants off said surface into said first vacuum hose segment, enters said cyclone-producing head, forms a cyclone, deposits contaminants within said first drum, exits though said outlet port of said first drum, enters said cyclone-producing chamber in said second drum, forms a cyclone of diameter greater than that formed in said cyclone-producing head, deposits more contaminants within said second drum, and sequentially passes through said primary filters and HEPA filter, before exhausting through said vacuum-producing means, whereby said vacuum collector can be used to conduct large-scale environmental remediation rapidly, safely, virtually non-stop, with infrequent filter cleaning or changing.

5. A vacuum collector according to claim 4 wherein said cyclone producing head is approximately 5 inches high and approximately 5½ inches in inner diameter, said inlet port of said head is approximately 1½ inches in outer diameter, said outlet port of said head is approximately 2 inches in outer diameter, and said first drum is at least 10 inches in inner diameter.

6. A vacuum collector according to claim 4 further comprising an additional inlet port for admitting contaminant laden air into said cyclone-producing head along a path tangential to said side wall of said head.

7. A vacuum collector according to claim 6 wherein said cyclone-producing head is approximately 5 inches high and approximately 5½ inches in inner diameter, each of said inlet ports for admitting contaminant-laden air into said head is approximately 1½ inches in outer diameter, said outlet port of said head is approximately 2 inches in outer diameter, and said first drum is at least 10 inches in outer diameter.

8. A vacuum collector according to claim 4 wherein said inlet port for admitting contaminant laden air from said first drum is a pipe segment directing said airflow initially to a vertical direction through an approximately 45 degree bend, then clockwise to a direction tangential to the second drum side-wall from said vertical direction through an approximately 90 degree bend.

9. The vacuum collector of claim 8 wherein said pipe segment is approximately 2 inches in inner diameter, said lower section of said primary filter housing inside second drum is cylindrical, approximately 15 inches in inner diameter and approximately 8½ inches in height, and said second drum is also cylindrical, approximately 13 inches high, 18 inches in inner diameter.

10. A vacuum collector according to claim 4 wherein said primary filters are made of singed polyester felt.

11. The vacuum collector of claim 10 wherein the number of said primary filters is four and each of said filters is cylindrical, approximately 22 inches in height, approximately 5 inches in diameter.

12. A vacuum collector according to claim 4 further comprising a manual shaker for supporting said primary filters inside said primary filter housing and for manually shaking said filters to dislodge contaminants captured by said filters during operation.

13. A vacuum collector according to claim 4 wherein said HEPA filter comprises pleats of HEPA filter forming a cylinder, approximately 11.875 inches in inner diameter, approximately 4.875 inches high.

14. A vacuum collector according to claim 4 further comprising two inlet ports mounted to said cover of said first drum for connection to two hose segments each connected to a power tool.

15. The vacuum collector of claim 14 wherein said power tool is selected from the group consisting of grinders, needle-guns, wands, crevice tools, and squeegees.

16. A vacuum collector according to claim 4 wherein said vacuum producing means is two electric motors of combined power of approximately 2.8 hp.

17. A vacuum collector according to claim 4 further comprising a third drum interposed between and communicating with said first drum and with said second drum, said third drum having a cyclone generator with a helical roof, an inlet port feeding said contaminant laden air to said cyclone generator with a helical roof, and an outlet port, said inlet port of said third drum being connected to said outlet port of said first drum by said second vacuum hose segment, said outlet port of said third drum being fluidically connected to said inlet port of said second drum by a third vacuum-hose segment, whereby contaminant-laden air undergoes triple cyclonic cleaning before sequential filtration through said primary filters and HEPA filter, resulting in efficient separation of contaminants and prolonged filter life.

18. A vacuum collector according to claim 4 wherein said first drum, said second drum as well as said vacuum-producing-means housing are made of steel, and said primary filter housing as well as said HEPA filter housing are made of cast aluminum.

19. A vacuum collector according to claim 9 wherein said cyclone producing head is approximately 5 inches high, approximately 5½ inches in diameter said inlet port of said head is approximately 1½ inches in inner diameter, said outlet port of said head is approximately 2 inches in inner diameter, and said first drum is at least 10 inches in inner diameter.

20. The vacuum collector of claim 4 wherein said cyclone producing head is approximately 5 inches high and approximately 5½ inches in inner diameter, said inlet port of said head is approximately 2 inches in inner diameter, said outlet port of said head is approximately 2 inches in inner diameter and said first drum is at least 10 inches in inner diameter.

* * * * *